Nov. 16, 1965   E. FUNK   3,217,491
METHOD OF PRODUCING ENERGY IN A REACTION ENGINE
Filed Feb. 8, 1965   2 Sheets-Sheet 1

INVENTOR.
EUGENE FUNK
BY Henry Gifford Hardy
ATTORNEY

Nov. 16, 1965 E. FUNK 3,217,491
METHOD OF PRODUCING ENERGY IN A REACTION ENGINE
Filed Feb. 8, 1965 2 Sheets-Sheet 2

INVENTOR.
EUGENE FUNK
BY
*Henry Gifford Hardy,*
ATTORNEY

United States Patent Office 3,217,491
Patented Nov. 16, 1965

3,217,491
METHOD OF PRODUCING ENERGY IN A REACTION ENGINE
Eugene Funk, deceased, late of Reno, Nev., by Thomas N. Diehl, special administrator of the estate of Eugene Funk, Reno, Nev.
Filed Feb. 8, 1965, Ser. No. 431,225
2 Claims. (Cl. 60—39.69)

This is a continuation-in-part of an application Serial Number 246,476 filed December 21, 1962, now Patent No. 3,192,716, by Eugene Funk, and pending in the Patent Office at this time.

The invention relates to a machine which provides a rotating reaction or sequence of reactions which set up a progressive and circumferential turbulence about the given center. The resulting centrifugal force which is initiated by the burning of a vaporous fuel and the products of combustion, are released peripherally, which brings about a substantially uniform pressure and/or velocity at the periphery, and reduces the pressure to a minus quantity at the center. The detonating wave continues around in a circular or orbital path in the combustion chamber provided by the engine. The detonating wave or shock wave sets up a continuous pressure moving the products of combustion outwardly from the center toward the periphery. The lowered pressure at the center creates a negative pressure which draws in combustion air in excess of that needed for combustion.

It is therefore an object of the present invention to provide a power source which has no moving parts but which produces continuous and successively continuous shock waves from explosive combustion which is the source of power.

It is another object of the present invention to produce a power source which establishes reaction forces due to detonation of a fuel which becomes the driving force or useful energy of the engine.

It is another object of the present invention to provide an engine where the forces created by the detonation of the air and fuel vaporous mixture create the thrust.

Another object of the invention is to produce an engine which is in essence its own carburetor by mixing its own vaporous fuel for detonation.

It is still another object of the present invention to provide an engine wherein the detonation itself takes place at a relatively high pressure and high temperature causing the shock waves to move at an extremely high rate of speed.

Another object of the invention is to produce a machine useful as a power source which has an annular combustion chamber wherein the detonation takes place producing shock waves which are continuously propagated in a single direction of travel completely around the circle of 360°.

Another object of the invention is to provide an engine wherein the entire reaction takes place in the continuous detonation so that the mean temperature is far below that of the turbo-jet or jet engine although it operates like a turbo-jet in that the air for combustion goes directly to the combustion chamber.

Another object is to produce an engine where the force created involves no moving parts. In this manner the engine is not restricted by the physical properties of the materials used, permitting greater speeds and greater temperatures.

Another object is to produce an engine having a circular exhaust in which the efficiencies become more positive than in other power sources such as turbo-jets.

A still further object is to provide an engine which once it is started and operating, may be converted to a wide range of fuels including the cheaper fuels, thus making a wide range of fuels available for continued operation.

Still another object is to produce a reaction engine which is much lighter in weight, smaller in size and higher in efficiency than equivalent power sources.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Figure 2:
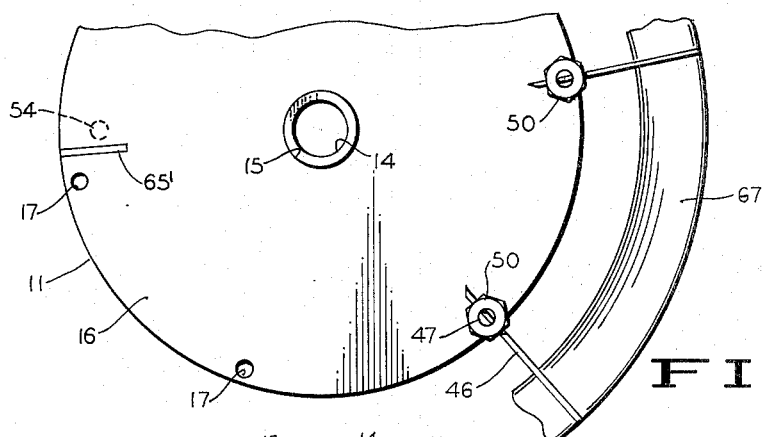
FIGURE 2 is a fragmentary top plan view of the assembled engine parts and showing the addition of the spaced venturi adjacent the peripheral edge.
Figures 1, 5:
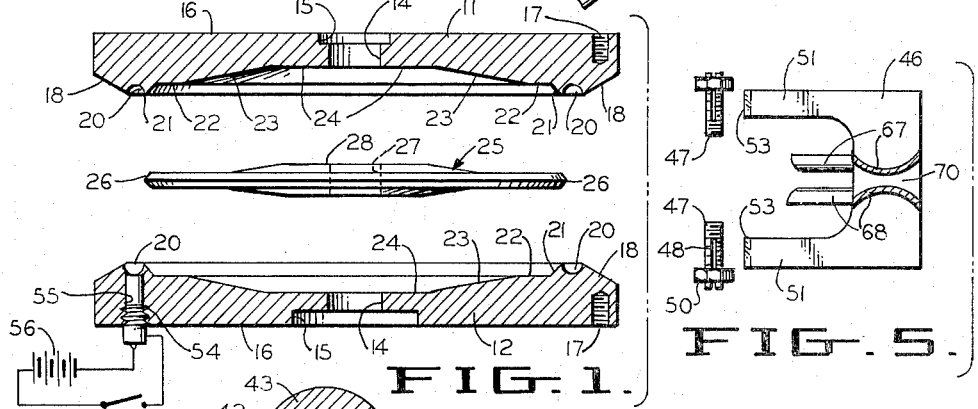
FIGURE 1 is an exploded view of the main elements of the engine showing the nature of the principal fixed elements.
FIGURE 5 is a side elevational view of the spacing C-members and the nuts which regulate the spacing.

The engine of the present invention is of simple construction and comprises two similarly shaped shell members, which for purposes of description will be identified as the top plate 11 and the bottom plate 12. As shown in FIGURE 2, these two plates 11 and 12, are circular with a central aperture 14 and a counterbore 15 of larger diameter which extends only a portion of the distance inwardly from the outer surface. The outer surface 16 of each of the members 11 and 12 is preferably flat, although the shape is not of significance. The outer face 16 is provided with spaced threaded holes 17 which extend inwardly only a portion of the distance and they do not extend through the plates. The purpose of the threaded holes 17 will be described subsequently. Threaded holes 17 are not shown completely, but it is to be understood that these are intended in spaced relation. The inner faces of each plate 11 and 12 is likewise similar. At the perimeter thereof there is an inwardly directed bevel 18, the inner edge of which joins an annular substantially semi-circular groove 20. The inner edge of this groove engages a downwardly and inwardly directed bevel 21. From the base of the bevel 21 there is a substantially flat portion 22 extending inwardly to a long inwardly sloping portion 23 and thence to a flat portion 24 which terminates at the center bore or hole 14.

The two plates 11 and 12 are assembled with their flat surfaces 16 outwardly and their shaped inner faces facing each other. While the precise forming of the shaped inner faces described from the inner bevel 21 inwardly is not required, nevertheless, the inner faces must be shaped for the purpose of forming chambers as will hereinafter be disclosed.

Interposed between the upper and lower plates 11 and 12 is a deflector plate 25. The deflector plate is a relatively thin circular plate having a diameter less than that of the plates 11 and 12. The perimeter of the plate 25 is beveled inwardly in both directions from the horizontal median point to leave an edge 26. The plate 25 has a central opening 27 which corresponds with the opening 14 of each of the top and bottom plates. The plate 25 may be thickened towards its center portion as at 28 although this is not necessary except for purposes which will be hereinafter described.

Figure 8:
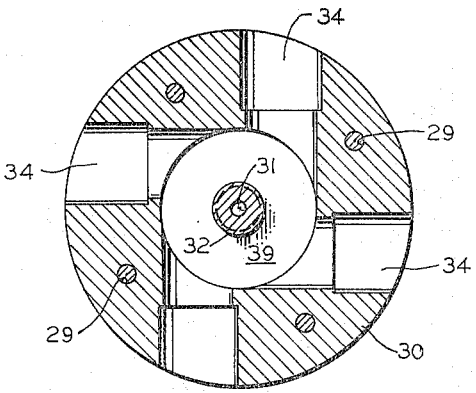
FIGURE 8 is a transverse section through the mounting block and air delivery chamber taken on the line VIII—VIII of FIGURE 3 and looking in the direction of the arrows.

The engine is preferably assembled on a valve block 30. (See FIGURES 3 and 8). The mounting block 30 is centrally bored longitudinally to provide a threaded passage 31 which receives the externally threaded hollow stem 32 which is threaded as at 33. This block is counterbored centrally around the axis of the passage 31 to a depth just below the air passages 34 to form the well 39. The block is also laterally bored for air passages 34 which open into a well 39 of the mounting block 30. The air passages 34 are angled with respect to the radius of the block so that one side of the bore becomes a tangent to the well opening. The block 30 has a collar 35, the outer diameter of which corresponds with the diameter of the counterboring 15 of the plate 12. Adjacent the collar 35 there is a flat shoulder 49. Through holes 29 may be drilled and axially spaced for the purpose of securing the block to the lower plate.

Figures 3, 6:
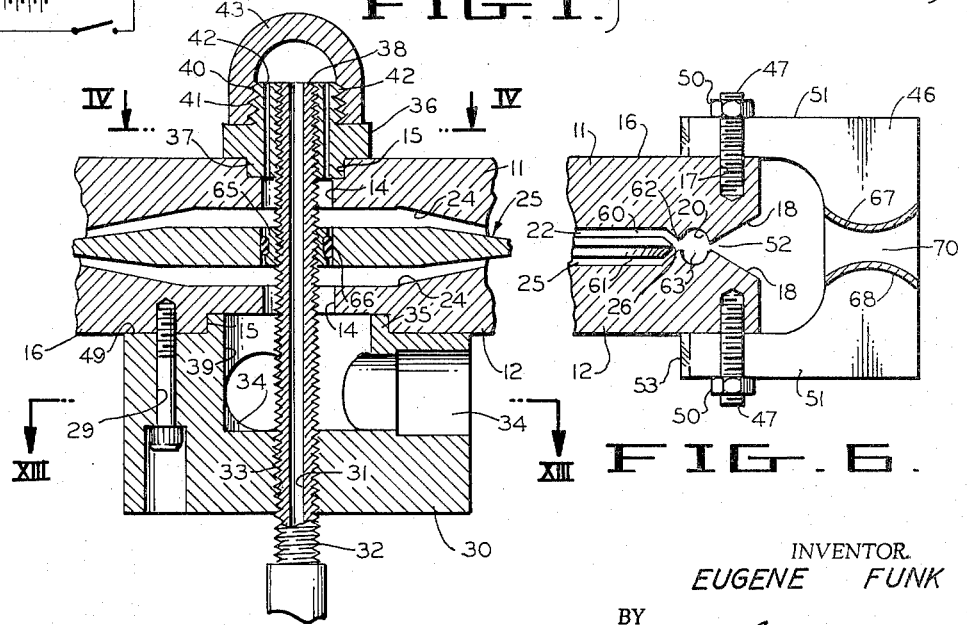
FIGURE 3 is a fragmentary assembly of the parts showing the feed structure for both the air and fuel, to the engine proper.
FIGURE 6 is a side elevational view of the spacing C-members in operative position with the assembled engine parts in fragmentary vertical section.
Figure 4:
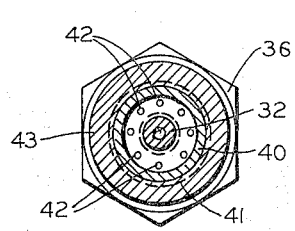
FIGURE 4 is a transverse section taken on the line IV—IV of FIGURE 3.

A nut-like member 36, which may be hexagonal in shape externally, is provided with an inner central flange 37 which exactly fits into the shoulder portion of the plate 11 with a friction fit (see FIGURES 3 and 4). The nut-like member 36 is internally threaded as at 38 for threaded engagement with the upper end of the externally threaded stem 32. Above and outwardly of the hexagonal portion of the nut 36 is a circular portion 40 which is externally threaded as at 41. Passing completely through the nut-like member 36 and its upper portion 40 are passages 42. The longitudinal passages 42 are arranged radially around the central axis. Surrounding the upper portion 40 of the nut member 36 is a hollow dome 43 which is internally threaded for engagement with the external threads 41 of the portion 40. As is shown in FIGURE 3, when the dome member 43 is in position, the mouth thereof engages and seals against the outer face of the nut-like member 36.

In assembling the various members, the valve section 30 is the base and through this the threaded stem 32 is appropriately positioned. Over this is placed the plate member 12 with its outer flat surface 16 downwardly and the axial alignment is attained when the flange 35 of the valve member seats in the counterbore 15 of the lower plate 12 with a friction fit. It will be noted that the hollow stem 32 projects upwardly therethrough and extends axially upwardly through the opening 14. Next the deflector plate 25 is placed axially in register with but spaced from the bottom plate 12. In order to maintain the plate 25 in its appropriate relative position a collar 65 is threaded onto the stem 32 until it arrives at the desired location. The collar 65 is provided with an annular O ring 66. Since the collar 65 is substantially the same diameter as the opening 27, the plate 25 fits therearound in fluid tight engagement because of the O ring 66. It will be observed that the plate will nest toward the face of the bottom plate 12 leaving a chamber between the plate 25 and the shaped surface of the bottom plate 12. The extent of the chamber is determined by the shape of the inner face and the extent to which the deflector plate 25 has been thickened, if any. Toward the periphery of the face and adjacent the flat portion 22 there will be an annular passage 61. Next the top plate 11 is placed over the deflector plate 25 with the shaped inner surface toward said plate forming a chamber in substantially the same manner as has been set forth with respect to the lower plate 12 only opposite thereto. It will be observed by reference to FIGURE 6 that the peripheral point 26 of the deflector plate 25 is adjacent to but spaced from the apexes of the bevels 21 and points radially between the two. Next the nut member 36 is placed in frictional engagement within the counterbore 15 of the top plate 11 by engaging the same on the threads 33 of the hollow shaft 32. This is not turned up tightly as in the ultimate assembly allowance has to be made for spacing, as will hereinafter be described. The dome 43 is then placed in threaded engagement on top of the extension portion 40 of the nut 36.

To properly space and retain the adjusted position of the upper and lower plates 11 and 12, C-members 46 are provided and cooperate with threaded studs 47 which are slotted from their outer ends a portion of the longitudinal length as at 48, and adjusting nut 50. The slotted threaded studs 47 are placed in the threaded holes 17 of the upper and lower plates 11 and 12, respectively, with the slotted ends outward. When this has been done on both top and bottom plates, the arms 51 of the C-members 46 are slipped through the slots 48 at both top and bottom. Next the precise distance required between the abutting apexes of the outer bevels 18, which is the distance 52, is precisely measured and nuts 50 are turned up to hold this precise position, appropriately spacing the upper and lower plates. The spacing is important to eliminate the build up of the mean pressure in the combustion chamber. Care is taken to make the transverse opening 52 uniform around the circumference. The C-members 46 may have the free ends of their legs 51 tapered as at 53 to facilitate quick entry through the slots 48. The C-members 46 are positioned outwardly in register with the exhaust flow to provide a minimum of interference and vaning.

Between the positioned C-members 46 are parallel spaced and faced convex circular segments 67 and 68. These segments when positioned with the C-members form complete annular facing convex rings, interrupted by the vertical planes of the C-members. The spacing of the annular interrupted rings provides a modified venturi 70 therebetween. The venturi 70 is located in the same plane as the outlet 52 but spaced outwardly therefrom.

*Operation*

Before the operation of the engine can be initiated it is necessary to provide both fuel and a spark. A small spark plug 54 may be provided in a hole 55 which is drilled adjacent the perimeter of one of the plates, here shown to be in the base plate 12, with the hole 55 located so that it coincides with and intersects the annular substantially semicircular groove 20. The spark plug 54 is connected to any suitable source of electric power such as the battery 56. It is to be understood that a spark plug is not necesssary as it is used only for the initial firing and any suitable source of ignition will be satisfactory.

Fuel for this engine is a mixture of propane gas and air and the relative mixture of the ingredients can be varied to suit any type of circumstance or operation. Normally the ratio of the gas and air is controlled through suitable conventional valves (not shown), prior to the delivery thereof to the engine shown. The gas passes upwardly through the hollow stem 32 into the dome member 43. The dome acts as a plenum chamber and allows the equal radial distribution of the gas. The gas then passes downwardly through the small passages 42 of the nut members 36 into the chamber between the deflector plate 25 and the inner surface of the top plate 11. Initially it spreads radially outwardly and substantially uniformly through the passage 60 adjacent the perimeter. Compressed air, from a source not shown, is fed through the passages 34 of the mounting block 30 in suitable proportion to the fuel feed. The passages 34 being radially off center, impart a clockwise spinning action to the air within the well 39 and as the air is fed upwardly through the central aperture 14 into the chamber between the deflector plate 25 and the inner face of the lower plate 12 the clockwise spinning is maintained. The air then spreads radially and spirally into the passage 61 adjacent the perimeter. The gas and air meet at the tip or point which is identified as 62 (see FIGURE 6), which is adjacent the edge 26 of the deflector plate 25, and are mixed in the combustion chamber 63. The mixture is then a vaporous explosive mixture for the first time and is initially detonated by the spark plug 54 in the combustion chamber 63, which of course, is an annular combustion chamber. In the combustion chamber 63 the detonation wave develops a relatively high pressure and high temperature explosion so that the reaction is substantially complete. The exhaust goes outwardly through the transverse passage 52.

As alluded to earlier, the spark from the spark plug is used only momentarily and as a means of making the initial detonation. Thereafter the explosion is successively continuous around the annular combustion chamber in one direction only, here shown to be in a clockwise direction. During the remainder of the operation and other than the first instant of firing, no spark or other ignition source, other than its own, is required. In order to make sure that the combustion in an arc of 360° in a single continuous direction is achieved, a suitable block 65′, shown schematically only, may be interposed adjacent the spark plug 54 blocking the combustion chamber at the moment of ignition. It is apparent that more than one block 65′ can be used so that there will be several starting points for the detonation, breaking the 360° into segments.

As indicated earlier, the nature and amount of the fuel can be varied by appropriately shaping the inner face of the plate 11 and the amount of air proportionately, by shaping the inner face of the plate 12. Also as has been noted before, the size and volume of each of these chambers can be varied in accordance with the thickening of the deflector plate 25. Present results show that more efficiencies can be attained by carefully machining the semicircular grooves which form the combustion chamber.

Figure 7:
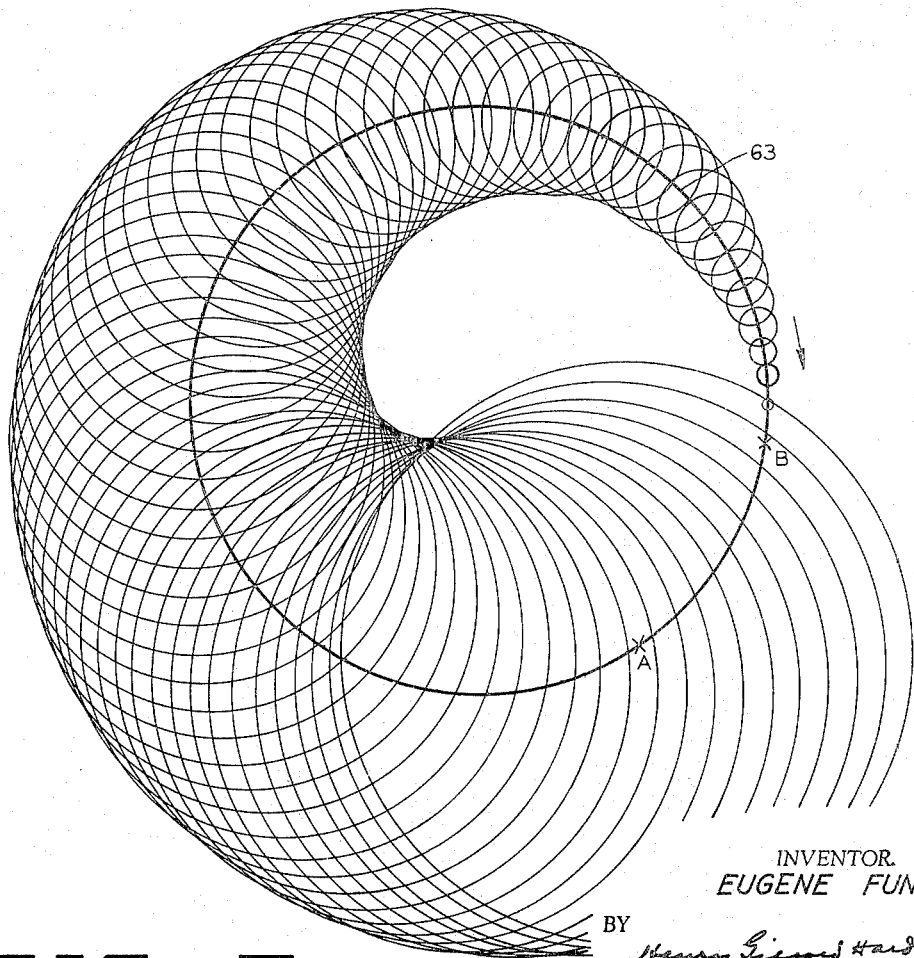
FIGURE 7 is a diagrammatic rendering of a shock wave in typical rotation around the annular combustion chamber in a clockwise direction.

Assuming the detonating wave traveling in one direction, clockwise, in the combustion chamber 63 and traveling at twice the speed of sound, and having traveled from point A to point B (see FIGURE 7), at the instant it reaches point B it will have generated a shock wave having a configuration which is shown diagrammatically in FIGURE 7. In order to make this more graphic it can be illustrated by the bow of a ship passing through water. Thus, if the bow represents the detonation wave, the bow wave would represent a shock wave spreading out behind. After the ship had traveled the distance from A to B at twice the speed of the surface wave, then a picture of the bow wave would be graphically represented by the diagram of FIGURE 7. It is apparent that the shock wave which is traveling in a circle has an inner portion and an outer portion. The inner portion being that within the circle of travel and the outer portion being that extending beyond the limits of the circle.

The operation of a power source constructed as shown in the drawings has produced a detonation wave generating a shock wave at a frequency of 4,500 cycles per second. This has been determined by measurements on an oscilloscope. In the engine tested and operated, the length of the annular combustion chamber 63 was 12.481 inches, which when multiplied by the cycles per second gave a detonation wave velocity of 56,628 inches, or 4,719 feet per second. Assuming the basic speed of sound at 32° F. as 1,088 feet per second, and dividing this into the velocity attained, gives a rate of 4.34 times the speed of sound. Considering that the temperature rise is equal to the square of the increase of molecular velocity $(4.34)^2$, the temperature of detonation at this velocity was 9,261.7° F. (absolute zero at $-459.6°$ F.$+32°$ F.$\times 18.84$). The pressure in the detonation wave was 237.08 p.s.i. Atmospheric pressure at the time of the test was 12.584 p.s.i. Since one horsepower is 550 foot pounds per second, each pound of air-fuel mixture per second delivered 8.51 horsepower.

As indicated earlier, the spark from the spark plug 54 initiates the detonation wave which then propagates itself in a single direction (clockwise shown here) continuously and successively in a 360° path during the operation. The combustion heat is largely absorbed by the housing of the engine, i.e., plates 11 and 12, which in turn produce a pre-heating and an increase in the molecular velocity of the operation.

The set pitch of the exhaust through the transverse nozzle opening 52 may be damped out by the use of the circular venturi 70 which is spaced an appropriate distance therefrom. When the venturi 70 is used a substantially silent continuous exhaust stream with no implosions, explosions, or echoes is attained. No power is wasted in the removal of the sound except for frictional loss on the surfaces of the venturi.

As has been stated earlier, the shock wave traveling in a circular orbit shown diagrammatically in FIGURE 7, is divided into interior portions and exterior portions. The interior portions are those within the circle of travel while the exterior portions are those without the circle of orbit. The energy of the exterior portion of the shock waves is already in useful position. This energy together with the exhaust passes through the transverse throat 52. The energy of the interior portion of the shock waves generated by the detonation waves under these conditions, resolves itself into a vortex having a centrifugal energy of velocity which is released through the throat 52. However, to reach this point it is necessary to understand that the centripetal energy of the interior portion of the shock waves due to the continual impact of the feed, resolves itself into the equal and opposite centrifugal molecular energy of velocity minus, of course, the frictional surface loss in the housing plates. It follows, therefore, that the greater input of centripetal energy the greater the centrifugal energy returned and received for useful work.

In the creation of the vortex the pressure at the center or adjacent the threaded hollow stem 32 is reduced and the pressure at the outlet throat 52 is increased. The resultant flow from low pressure to high pressure provides a suction which continuously recharges the chambers with air and fuel for combustion, and supplies these materials for mixing in the combustion chamber. The faster the recharging, the faster the centrifugal energy is produced, with a resultant gain which is cumulative. The fact that the operation of the engine results in gain makes it apparent that its operation is not restricted to the usual characteristics of the material which makes up the structure of the engine.

The spacing of the exhaust throat 52 is set so that there is no means pressure attained in the combustion chamber. This is important because for efficient operation, any interference with the internal portion of the shock wave should be avoided.

For purposes of this specification the term detonate means to explode with a sudden violence to produce shock waves as opposed to burning, the main purpose of which is to produce heat.

What is claimed is:

1. The method of producing energy in a reaction engine comprising delivering proportioned amounts of fuel and air to a common mixing point adjacent an annular detonating chamber to provide an explosive mixture, detonating said explosive mixture in an annular chamber in a circular orbit continuously and successively in one direction only, providing a gate across the annular chamber internally to start the circular orbit in one direction only and exhausting through a contiuous peripheral port in the direction established and maintained by said detonation.

2. The method of claim 1 wherein the detonation of the exposive mixture is continuously and successively propagated in the circular orbit of the starting detonation.

References Cited by the Examiner

UNITED STATES PATENTS

| | | | |
|---|---|---|---|
| 1,539,111 | 5/1925 | French et al. | 60—39.74 |
| 1,656,907 | 1/1928 | Bansen | 158—99 |
| 2,220,572 | 11/1940 | Knupp | 158—99 |
| 2,361,097 | 10/1944 | Hess | 158—99 |
| 2,648,166 | 8/1953 | Fisher et al. | 158—99 |
| 2,952,124 | 9/1960 | Pearson | 60—35.6 |

FOREIGN PATENTS 564,754   11/1932   Germany.

MARK NEWMAN, *Primary Examiner.*